Aug. 16, 1949.    G. GUANELLA    2,479,489
DIRECT READING RADIO DIRECTION FINDER
Filed Sept. 3, 1947    2 Sheets-Sheet 1
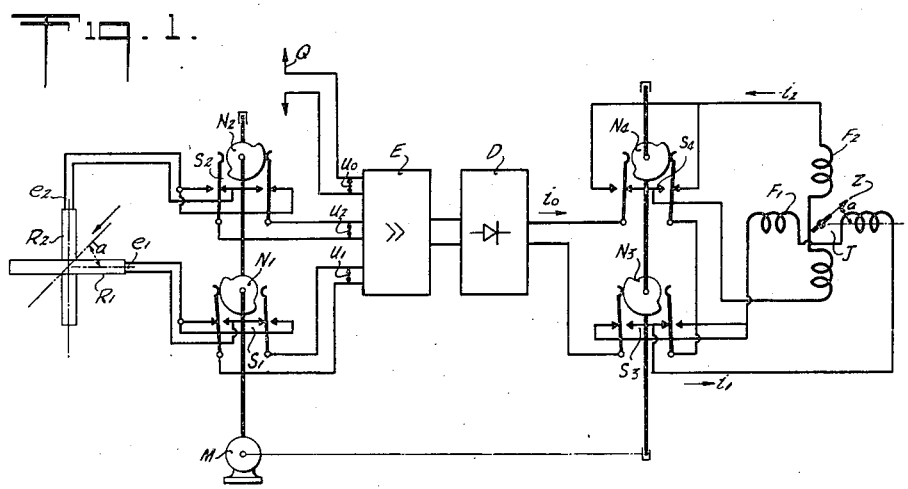
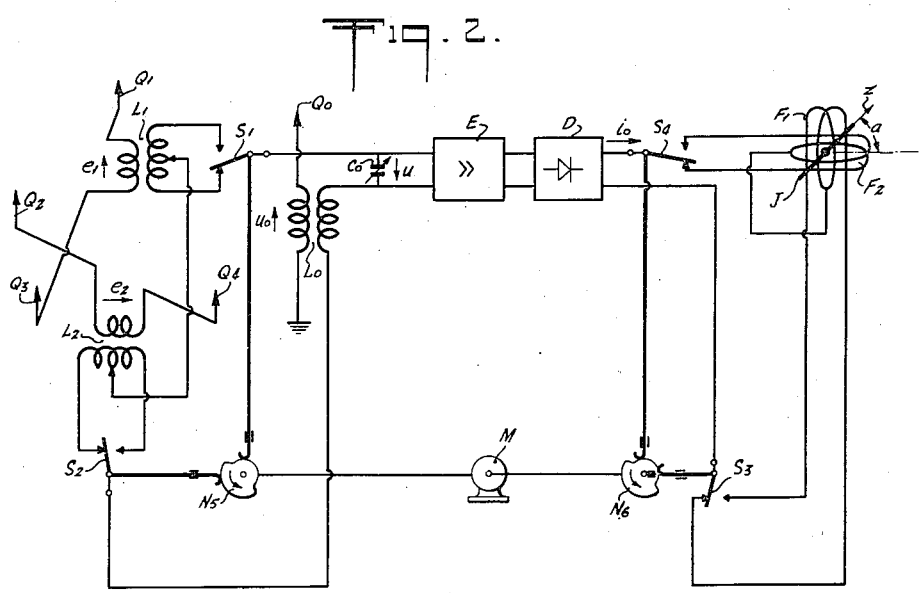
INVENTOR
GUSTAV GUANELLA
BY
ATTORNEY Aug. 16, 1949.  G. GUANELLA  2,479,489
DIRECT READING RADIO DIRECTION FINDER
Filed Sept. 3, 1947  2 Sheets-Sheet 2
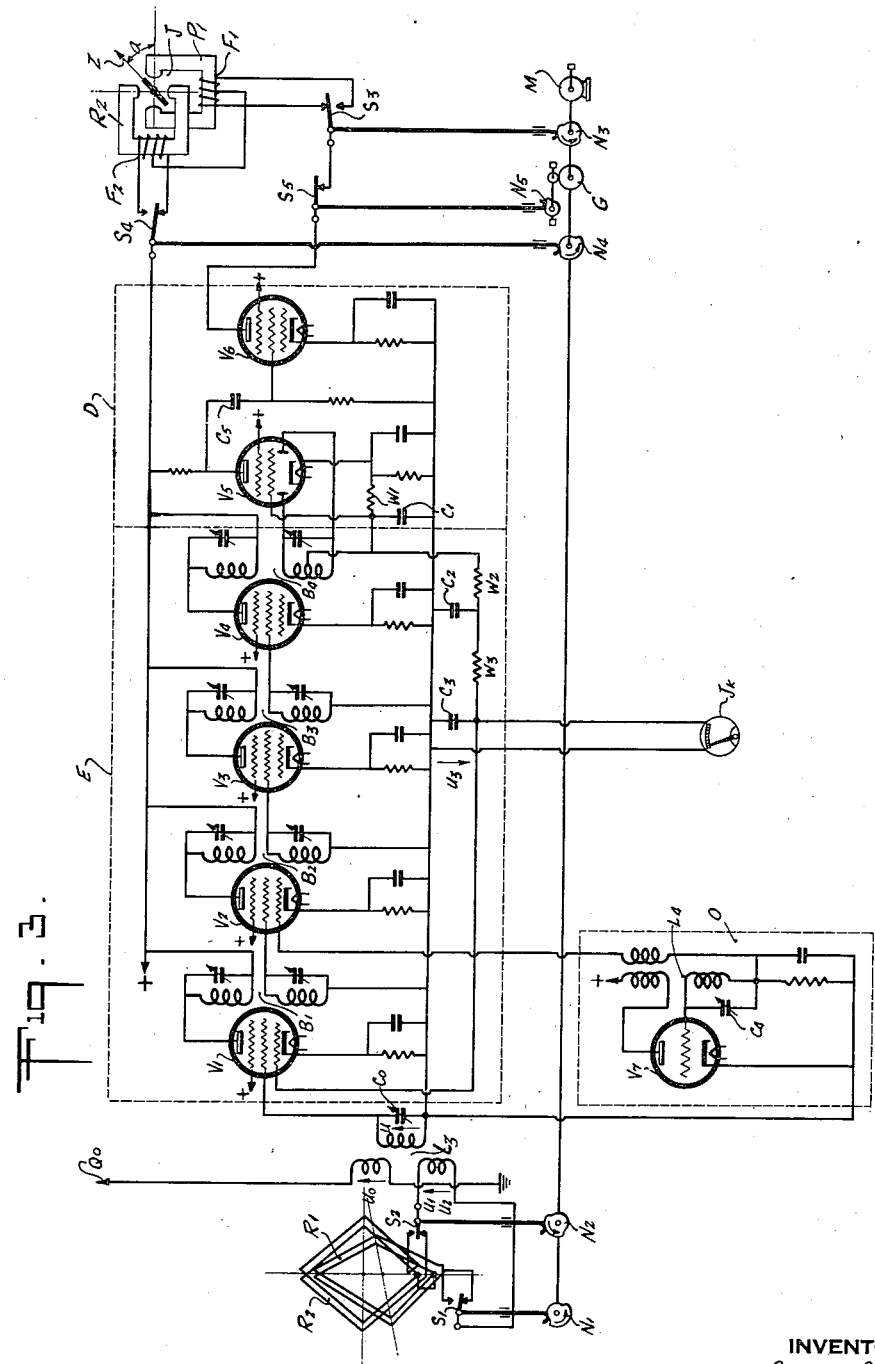
INVENTOR
GUSTAV GUANELLA
BY
ATTORNEY Patented Aug. 16, 1949

2,479,489

UNITED STATES PATENT OFFICE 2,479,489

DIRECT READING RADIO DIRECTION FINDER

Gustav Guanella, Zurich, Switzerland, assignor to Radio Patents Corporation, New York, N. Y., a corporation of New York Application September 3, 1947, Serial No. 771,916 In Switzerland October 16, 1939

Section 1, Public Law 690, August 8, 1946 Patent expires October 16, 1959

12 Claims. (Cl. 343—120)

The present invention relates to a system for and a method of determining the angle of incidence of electromagnetic energy by means of a direct indication or measurement.

There are already known arrangements comprising a rotating loop or frame aerial, wherein by a comparison of the phase of the amplified and rectified loop voltage with the phase of a voltage corresponding to the momentary position of the loop, a direct indication of the direction of incidence of an incoming radio wave is obtained. The revolving loop or goniometer systems necessary in such installations require considerable driving arrangements and substantial difficulties are experienced in many cases for reasons of limited space and weight, in particular in the case of aircraft and similar applications. Furthermore, substantial interference and indicating errors may occur due to the large number of mechanically moving elements required in arrangement of this type.

It has also become known to use a pair of fixed orthogonal or crossed loops for effecting a direct bearing indication. In devices of this type, the voltages induced in the loops are alternately received at the rate or modulated by quadrature components of a low frequency auxiliary voltage and commonly amplified. The direction indication is effected as in the case of a rotating aerial, by determining the phase difference between said auxiliary voltage and the combined amplified and rectified loop voltages. Such a phase comparison is subject to substantial indicating errors, especially if the frequency of the auxiliary voltage is not maintained at a sufficiently constant value.

An object of the present invention is the provision of an improved direct reading direction finder or radio compass which is substantially devoid of the drawbacks and disadvantages inherent in the arrangements according to the prior art; which is both simple in design and efficient and reliable in operation; and which will enable a direct automatic bearing indication within a full 360° angle and without any directional ambiguity.

These and further objects as well as novel aspects of the invention will become more apparent from the following detailed description taken in reference to the accompanying drawings forming part of this specification and wherein:

Figure 1 is a block diagram schematically illustrating the construction of one form of radio direction finder constructed in accordance with the principles of the invention;

Figure 2 is a block diagram showing a modified direction finder system according to the invention; and Figure 3 is a complete circuit diagram of a direct reading radio direction finder embodying the principles of the invention.

Like reference characters identify like parts in the different phases of the drawings.

With the aforementioned objects in view, the invention involves generally the provision of a pair of directional antennae having directional patterns whereby the amplitudes of the voltages induced therein vary according to a sine and cosine law, respectively, as a function of the direction of propagation of an incoming radio signal. Such directional patterns are generally known in the form of figure-of-eight diagrams and may be obtained by means of a pair of orthogonal loops or dipole antennae in a manner well known.

The voltages received by both antennae are reversed or commutated alternately and sequentially at a low frequency rate and then amplified and rectified together with the voltage received by a third non-directional antenna, whereupon the combined rectified current is divided into two components which are in turn reversed alternately and sequentially in synchronism with the reversal of the respective antenna voltages. The thus obtained alternating output currents are applied each to one of a pair of orthogonal field coils of a rotary field indicator comprising a premagnetized rotary or flux carrying member, whereby the latter will be automatically positioned so as to point in the direction of the incoming radio signal within a full operating or angular range of 360°.

Referring more particularly to Figure 1, there are shown a pair of fixed and crossed loop antennae $R_1$ and $R_2$ which are preferably concentric to prevent mutual coupling. The high frequency voltages $e_1$ and $e_2$ induced in said loops are alternately and sequentially reversed in phase by the aid of a pair of reversing or commutating switches $S_1$ and $S_2$ driven by means of a motor M and a pair of cams $N_1$ and $N_2$, respectively. The loop voltages $u_1$ and $u_2$ after commutation by the switches $S_1$ and $S_2$ are combined with the signal voltage $u_0$ received by a non-directional antenna Q and the resultant voltage is applied to the input of a radio frequency amplifier E. The amplified high frequency oscillations are rectified in the director D and the retified output current $i_0$ is applied to the crossed field coils $F_1$ and $F_2$ of a rotary field indicator J by way of a pair of further commutating switches $S_3$ and $S_4$ operated synchronously with the switches $S_1$ and $S_2$, respectively. The pointer Z of the indicator J is connected with a premagnetized rotary flux carrying member in the form of a permanent magnet or the like, whereby said pointer will be automatically positioned to directly indicate the direction of an incoming radio wave received by the antennae $R_1$ and $R_2$ and $Q$, as will be further explained in the following.

The function and operation of the invention will become further apparent from the following theoretical analysis.

Assuming an angle of incidence $a$ of the incoming radio wave to which the antennae $R_1$, $R_2$ and Q are tuned with respect to the loop $R_1$, as indicated by the arrow in Figure 1, the high frequency voltages induced in the loops $R_1$ and $R_2$ may be written by the following formulae:

$$e_1 = A \cos a \cdot \sin (vt) \quad (1)$$
$$e_2 = A \sin a \cdot \sin (vt) \quad (2)$$

wherein A is a constant depending upon the receiving conditions and the characteristics of the antennae and $v$ represents the angular velocity of the received high frequency oscillations. Similarly, the voltage received by the non-directional antenna Q may be written as follows:

$$u_0 = A \cdot C \sin (vt) \quad (3)$$

wherein the constant C depending upon the antenna characteristics is assumed to be greater than $\sqrt{2}$.

The commutating switches $S_1$ and $S_2$ are so designed, such as by properly shaping the cams $N_1$ and $N_2$ as shown in the drawing, as to provide four sequential positions or commutating periods of equal duration, in such a manner that the phases or polarities of the loop voltages applied to the input of the receiver E vary as follows during the successive commutating periods within a complete commutating cycle:

Period I: $u_1 = e_1$ $u_2 = e_2$ \quad (4)
Period II: $u_1 = -e_1$ $u_2 = e_2$
Period III: $u_1 = -e_1$ $u_2 = -e_2$
Period IV: $u_1 = e_1$ $u_2 = -e_2$ The total input voltage $u$ of the receiver is composed of the commutated loop voltages and the voltage of the non-directional antenna Q as follows:

$$u = u_0 + u_1 + u_2 \quad (5)$$

By combining Equations 1, 2, 3 and 4, the total receiver voltages during the successive commutating periods will be as follows:

Period I: $u = A(C + \cos a + \sin a) \cdot \sin (vt)$ \quad (6)
Period II: $u = A(C - \cos a + \sin a) \cdot \sin (vt)$
Period III: $u = A(C - \cos a - \sin a) \cdot \sin (vt)$
Period IV: $u = A(C + \cos a - \sin a) \cdot \sin (vt)$ Voltage $u$ is amplified in the receiver E and rectified by the detector D of any known design or construction. As a result of the rectification, the high frequency components of the signal are eliminated, whereby the output current $i_0$ during the successive commutating periods varies as shown in the following:

Period I: $i_0 = K(C + \cos a + \sin a)$ \quad (7)
Period II: $i_0 = K(C - \cos a + \sin a)$
Period III: $i_0 = K(C - \cos a - \sin a)$
Period IV: $i_0 = K(C + \cos a - \sin a)$ wherein K is a constant depending upon the gain or degree of amplification. The rectified current $i_0$ is applied to the orthogonal field coils $F_1$ and $F_2$ of the indicator J by way of the further commutator switches $S_3$ and $S_4$, respectively. Since the latter are operated synchronously with the antenna switches $S_1$ and $S_2$, respectively, the currents passing through the field coils $F_1$ and $F_2$ will be periodically reversed during the successive commutating periods according to the following plan or schedule:

Period I: $i_1 = i_0$ $i_2 = i_0$ \quad (8)
Period II: $i_1 = -i_0$ $i_2 = i_0$
Period III: $i_1 = -i_0$ $i_2 = -i_0$
Period IV: $i_1 = i_0$ $i_2 = -i_0$ Accordingly, the mean value of the exciting currents for the field coils $F_1$ and $F_2$ are as follows in accordance with Equations 7 and 8:

$$i_{1m} = K \cos a \quad (9a)$$
$$i_{2m} = K \sin a \quad (9b)$$

In accordance with these mean values, a mean resulting vector is produced by the magnetic fields of both coils $F_1$ and $F_2$, said resulting vector forming an angle $a$ with respect to a zero or reference direction assumed to coincide with the plane of the loop $R_1$, in the example shown in the drawing. The rotary magnet of the indicator is unable to follow the alternating components of the resultant field on account of its mechanical inertia and accordingly will adjust itself in the direction of the resultant field vector. Consequently, the indicating pointer Z connected to the rotary magnet or an equivalent flux carrying member will point directly in the direction of incidence of the radio wave received by the loops $R_1$ and $R_2$ and the non-directional antenna Q.

In place of loop or frame aerials, any other known directional antennae having similar directional characteristics or patterns may be employed for the purpose of the invention. Thus, referring to Figure 2, there is shown a known Adcock type directional antenna system, comprising four vertical or open antennae $Q_1$, $Q_2$, $Q_3$ and $Q_4$ arranged at the corners of a square in a manner well known, such an antenna system being characterized by the elimination of the bearing error due to so-called night effect inherent in standard closed loops, as shown in Figure 1.

The antenna voltages in Figure 2 are again represented by Equations 1 and 2. These voltages are applied by way of a pair of coupling transformers $L_1$ and $L_2$ to the commutating switches $S_1$ and $S_2$, which latter are operated alternately and sequentially by means of a driving motor M and a rotating cam $N_5$. Accordingly, the polarity of the voltages at the outputs of the commutating switches again varies as represented by Equations 4. The sum of these voltages together with the signal voltage $u_0$ of the non-directional antenna $Q_0$ is applied by means of a further coupling transformer $L_0$ to the input of the receiver or radio frequency amplifier E in a manner similar to Figure 1.

The coupling transformers for the antenna systems are tuned to the frequency of the received radio wave by means of a tuning condenser $C_0$, in a manner well understood. The amplified combined high frequency voltage is in turn rectified by the detector D, the rectified output current $i_0$ being proportional to the amplitude of the combined input voltage $u$. The output current $i_0$ is applied to the field coils $F_1$ and $F_2$ of the indicator J by way of the commutating switches $S_3$ and $S_4$.

Figure 2 differs further from Figure 1 by the provision of a single rotating cam $N_5$ operating both antenna switches $S_1$ and $S_2$. For this purpose, the center points of the secondary windings of the coupling transformers $L_1$ and $L_2$ are directly connected, thus obtaining a reversal of the phase or polarity of the received voltages by utilizing the current passing through one or the other half of the windings, in a manner well understood. Similarly, the center points of the field coils $F_1$ and $F_2$ of the indicator J are directly connected, to enable the use of a single rotating cam $N_6$ operating the output switches $S_3$ and $S_4$ and driven synchronously with the cam $N_5$ by the motor M.

Thus, depending upon the position of the commutating switches $S_3$ and $S_4$, one or the other half of the field windings $F_1$ and $F_2$ will be traversed by the output current $i_0$, or in other words, the current passing through each coil is reversed by the switches $S_3$ and $S_4$ in a manner as represented by Equation 8 and in synchronism with the commutation of the antenna voltages $e_1$ and $e_2$. Since the pointer Z of the premagnetized rotary member of the indicator will be positioned so as to point in the direction of the resultant magnetic field, the indicator again operates to directly show the direction of a received radio wave within a full 360° angle or operating range.

Referring to Figure 3, there is shown a complete circuit diagram of a radio compass system according to the invention embodying a superheterodyne receiver and other features to improve the effectiveness and reliability of the direction or bearing indication. The commutating switches $S_1$ and $S_2$ operated by the motor M through the cams $N_1$ and $N_2$ alternately and sequentially connect one of the two halves of the loop antennae $R_1$ and $R_2$ with the input circuit of the receiver, for which purpose the center points of the loops are connected directly in a manner analogous to the connection shown in Figure 2. Accordingly, the voltage $u_1$ and $u_2$ across the primary winding of the input transformer $L_3$ vary according to the switching plan represented by Equations 4. A further high frequency voltage $u_0$ received by the non-directional antenna $Q_0$ is applied to the input of the receiver, whereby the total receiver input voltage $u$ has a value as shown by Equation 5. The secondary winding of the input transformer $L_3$ is shunted by a tuning condenser $C_0$ for tuning the receiver to the frequency of the radio wave being received.

The high frequency input voltage applied to the receiver is at first amplified by means of a pre-amplifier tube $V_1$ and band-pass filter or tuned coupling transformer $B_1$ connected in the anode circuit of the tube in accordance with standard practice. The amplified high frequency voltage is then combined in a mixer tube $V_2$ with an auxiliary voltage supplied by the heterodyne oscillator O. The latter is shown to consist of a regenerative oscillator comprising a triode $V_7$ and a grid tank circuit $C_4L_4$ regeneratively coupled with the anode circuit in a manner well known and understood.

The intermediate frequency oscillations produced in the output circuit of the mixer $V_2$ are applied by way of a further band-pass filter $B_2$ to an intermediate frequency amplifier comprising two stages $V_3$ and $V_4$ with coupling transformers $B_3$ and $B_4$, respectively. The amplified intermediate frequency oscillations are rectified by the duo-diode system of a further low frequency amplifying tube $V_5$ of known construction, resulting in a voltage at the center point of the secondary winding of the output transformer $B_4$ being proportional to the high frequency amplitude in accordance with Equations 7. Condenser $C_1$ serves to suppress the high frequency components of this voltage developed across a coupling resistance $W_1$ and being further amplified by the amplifying section of tube $V_5$ and additional low frequency amplifier $V_6$.

The coupling condenser $C_5$ connecting tubes $V_5$ and $V_6$ suppresses the direct current component of the voltage impressed upon the input grid of tube $V_6$, i. e., the direct current component of the current passed through the switches $S_3$ and $S_4$ remains constant and corresponds to the mean anode current of the tube $V_6$. Accordingly, the current $i_0$ again varies according to Equations 7, wherein however the product KC does not depend upon the receiving conditions, but merely varies with the mean anode current of the last tube. This is without effect on the direction indication, since the direct current component of $i_0$ due to the continuous commutation, has no effect upon the bearing indication.

The current $i_0$ is alternately applied by way of the switches $S_3$ and $S_4$ to the field coils $F_1$ and $F_2$ of the indicator J, whereby the currents passing through the latter are again reversed in synchronism with the switching operation. Consequently, the pre-magnetized rotary member of the indicator J carrying the pointer Z will be automatically positioned in the direction of the mean resulting field produced by the magnet cores $P_1$ and $P_2$ of the coils $F_1$ and $F_2$, thus again resulting in a direct bearing indication in angular degrees within a full 360° range, in a manner similar to the preceding arrangements.

It is possible that the accuracy of the direction indication may be impaired by incorrect operation of the switches $S_1$ to $S_4$. This is especially the case if the commutation due to inaccurate adjustment of the cams $N_1$ to $N_4$ does not occur within the exact prescribed time intervals. In order to eliminate interferences or errors due to slight deviations of the commutation from the prescribed instants, the current $i_0$, according to an improved feature of the invention, is momentarily interrupted by means of a further switch $S_5$ during the interrupting instants. The interrupter $S_5$ is operated through a further cam $N_5$ driven by a gear G from the motor M, said cam being designed to perform a full revolution during each switching period. Accordingly, the intervals or duration of the interruptions by the switch $S_5$ are exactly equal for all positions of the commutators $S_1$ to $S_4$ and a disturbing influence during the interruptions upon the bearing indication will be no longer noticeable. Accordingly therefore, any interference due to inexact commutation is substantially eliminated, since no current passes through the coils $F_1$ and $F_2$ during the commutating periods of the switches $S_3$ and $S_4$.

In view of the variable amplitude of the received radio signals, it is advantageous to provide means for effecting an automatic gain control, to substantially maintain equal exciting currents for the direction or bearing indicator. This automatic gain control is obtained in Figure 3 by filtering a portion of the amplified intermediate frequency energy by means of a smoothing filter comprising a pair of series resistances $W_2$ and $W_3$ and shunt condensers $C_2$ and $C_3$, whereby to produce a control voltage $u_3$. The latter is applied to a gain control grid of the pre-amplifier $V_1$ in such a manner as to automatically maintain a mean or average high frequency and intermediate frequency amplitude, in a manner well understood by those skilled in the art.

In an automatic gain control arrangement of this type, when used in connection with the invention, the time constant of the smoothing filter should be sufficiently high so that the amplification or gain during a full operating period or revolution of the commutating switches remains practically constant. In this case, the conditions according to Equations 7 are maintained, whereby the constant K will be less dependent upon the receiving conditions and has substantially the same value during all four switching periods.

According to a further feature of the invention, the mean amplitude of the rectified high frequency voltage is indicated by a control or monitoring instrument $J_k$, whereby to enable a constant supervision and apprise the operator if any signals are received and whether the response of the bearing indicator is actually due to an incoming radio wave and not due to any accidental disturbing voltage or other interference.

As pointed out above, any known twin-antenna system having directional characteristics similar to those of a pair of crossed loops or dipoles may be employed for the purpose of the invention. Furthermore, in place of cam-operated switches, switches comprising sliding contacts or any other known type of switch arrangement may be used in connection with the invention. More specifically, electric switches or valves may be used in place of mechanical switch arrangements, in which case a pair of quadrature control or switching voltages are advantageously applied to the control grids of the switching tubes. Furthermore, the received voltages may be amplified by separate pre-amplifiers and an additional low frequency amplifier may be connected between the output of the rectifier and the bearing indicator.

The invention is not limited to the indication of the direction or angular position of an incoming radio wave, but may also be used in connection with remote indication or control in combination with suitable control devices. Thus, the deflection of the indicator J may be utilized for automatically operating a control or steering mechanism. For this purpose, the indicator may be associated with an electric contact arrangement capable of producing a positive or negative current whenever the receiving direction deviates from a predetermined directional line or course by a certain amount in one or the other sense. These control currents are then used to operate a control mechanism such as a rudder, which in turn serves to control the course of a movable craft in such a manner as to automatically maintain the craft at a given course.

From the foregoing the advantages and novel results of the direction finder of the invention will be evident: Without requiring any movable or rotatable antennae, a direct indication of the direction of incidence of a radio signal is enabled without ambiguity and within a full 360° scale or operating range. This object is achieved by means of a single receiver without any operating requirements regarding constancy of gain or amplification, time constant and phase distortion, in contrast to known direction finder systems of similar construction according to the prior art. Furthermore, no synchronization or speed control of any moving parts is required by the invention, nor is it necessary to especially calibrate the indicator whose operation is positive and of high accuracy. The circuit elements and arrangements are substantially of standard construction and necessitate a minimum of bulk and weight, while insuring a high degree of operating stability.

While there have been shown and described a few desirable embodiments of the invention, it is understood that this description is for the purpose of illustration and that various changes in shape, proportion and arrangements of parts, as well as the substitution of equivalent elements for those herein shown and described may be made without departing from the spirit and scope of the invention, as defined in the appended claims. The specification and drawings are, accordingly, to be regarded in an illustrative rather than a limited sense.

I claim:

1. A radio direction finding system comprising a pair of directional antennae of the type producing receiving voltages from an incoming radio signal having amplitudes varying according to a sine and cosine law, respectively as a function of the signal direction, a non-directional antenna, first commutating means for alternately and sequentially reversing, at a low frequency rate, the phases of the voltages received by said directional antennae, means for additively combining both the commutated voltages and the signal voltage received by said non-directional antenna into a single input voltage, amplifying and detecting means for said input voltage to produce a low frequency output current, an indicator having a pair of field windings oriented at angles of 90° with respect to each other, a rotary polarized member arranged for cooperating with said windings, and second commutating means operated in synchronism with said first commutating means and connected between said rectifying means and said indicator, for producing exciting currents for said field windings having phases being alternately and sequentially reversed in synchronism with the phase reversal of the respective receiving voltages of said directional antennae.

2. A radio direction finding system comprising a pair of crossed and co-axial loops, a non-directional antenna, first commutating means for alternately and sequentially reversing, at a low frequency rate, the phases of the voltages induced in said loops by an incoming radio signal, means for additively combining both the commutated voltages and the signal voltage induced in said non-directional antenna into a single input voltage, amplifying and rectifying means for said input voltage for producing a low frequency output current, an indicator having a pair of field windings oriented at angles of 90° with respect to each other and a pre-magnetized rotary member cooperating with said field windings, and second commutating means operated in synchronism with said first commutating means and connected between said rectifying means and said indicator, for producing exciting currents for said field windings having phases being alternately and sequentially reversed in synchronism with the phase reversal of the respective loop voltages.

3. A radio direction finding system comprising a pair of directional antennae of the type producing receiving voltages from an incoming radio signal varying in amplitude according to a sine and cosine law, respectively, as a function of the signal direction, a non-directional antenna, first commutating means for alternately and sequentially reversing, at a low frequency rate, the phases of the voltages received by said directional antennae, means for additively combining both the commutated voltages and the signal voltage received by said non-directional antenna into a common input voltage, amplifying and rectifying means for said input voltage for producing a low frequency output current, an indicator having a pair of field windings oriented at angles of 90° with respect to each other, a rotary permanent magnetic member cooperating with said windings, and second commutating means operated in synchronism with said first commutating means and connected between said rectifying means and said indicator, for producing exciting currents for said field windings having phases alternately and sequentially reversed in synchronism with the phase reversals of the voltages of the respective antenna systems.

4. In a radio direction finding system as claimed in claim 1, including means for momentarily interrupting the exciting currents through said field windings at the instants of commutation.

5. A radio direction finding system as claimed in claim 1, including automatic gain control means for said amplifying means having a time constant which is large compared with a full operating cycle of said commutating means.

6. In a radio direction finding system as claimed in claim 1, including means for indicating the mean amplitude of the combined and amplified signal voltage.

7. A radio direction finding system comprising a pair of directional antennae of the type producing receiving voltages from an incoming radio signal having amplitudes varying according to a sine and cosine law, respectively, as a function of the signal direction, a non-directional antenna, first commutating means for alternately and sequentially reversing, at a low frequency rate, the phases of the voltages received by said directional antennae, means for additively combining both the commutated voltages and the signal voltage received by said non-directional antenna into a common input voltage, amplying and rectifying means for said input voltage to produce an alternating output current having a frequency corresponding to the commutating frequency, an indicator having a pair of field windings oriented at angles of 90° with respect to each other, a rotary pre-magnetized member cooperating with said windings and having a mechanical inertia sufficient to be unaffected by field variations at the frequency of said output current, and second commutating means operated in synchronism with said first commutating means and connected between said rectifying means and said indicator, for producing exciting currents for said field windings having phases being alternately and sequentially reversed in synchronism with the phase reversals of the voltages of the respective directional antennae.

8. A radio direction finding system comprising a pair of crossed loops having center points directly connected with each other, a radio receiver-amplifier and rectifier including a first and second input coupling means, switching means connected between both said loops and said first coupling means, operating means for said switching means for alternately and sequentially connecting pairs of all possible combinations of winding halves of said loops to said receiver, a non-directional antenna connected to said receiver through said second coupling means, an indicator having a pair of field windings oriented at angles of 90° with respect to each other and having center points directly connected with each other, a polarized rotary member arranged for cooperation with said field windings, and further switching means operated in synchronism with said first switching means for alternately and sequentially connecting pairs of all possible combinations of winding halves of said field windings to the output of said rectifying means in synchronism with the connection of the respective loop windings.

9. In a radio direction finding system as claimed in claim 8, including automatic gain control means for said amplifier having a time constant which is large compared to a full operating cycle of said switching means.

10. A radio direction finding system as claimed in claim 8, including an indicator responsive to the mean amplitude of the combined and amplified signal voltage received by said loops and directional antennae.

11. A radio direction finding system comprising a pair of co-axial and orthogonal loops having center points directly connected with each other, a radio receiver-amplifier and rectifier including a first and second input coupling means, switching means connected between both said loops and said first coupling means, operating means for said switching means for alternately and sequentially connecting pairs of all possible combinations of winding halves of said loops to said receiver, a non-directional antenna connected to said receiver through said second coupling means, an indicator comprising a pair of field windings oriented at angles of 90° with respect to each other and having center points directly connected with each other, a pre-magnetized rotary member arranged for cooperation with said field windings and having an inertia sufficient to be unaffected by field variations at the rate of the switching frequency, and further switching means operated in synchronism with said first switching means for alternately and sequentially connecting pairs of all possible combinations of winding halves of said field windings to the output of said rectifying means in synchronism with the connection of the respective loop windings.

12. A radio direction finding system as claimed in claim 11, including means for momentarily interrupting the currents through said field windings during the instants of commutation of said further switching means.

GUSTAV GUANELLA.

REFERENCES CITED

The following references are of record in the file of this patent:

UNITED STATES PATENTS

| Number | Name | Date |
| --- | --- | --- |
| 1,842,342 | Eaton | Jan. 19, 1932 |
| 2,392,420 | Steinhoff | Jan. 8, 1946 |